United States Patent [19]
Brakebill

[11] 3,850,039
[45] Nov. 26, 1974

[54] TEMPERATURE COMPENSATED PRESSURE SENSOR AND MOUNTING MEANS THEREFOR

[75] Inventor: Harold G. Brakebill, Concord, Tenn.

[73] Assignee: Robertshaw Controls Company, Richmond, Va.

[22] Filed: June 14, 1973

[21] Appl. No.: 370,199

[52] U.S. Cl. ............ 73/420, 200/83 N, 280/150 AB
[51] Int. Cl. .......................... G01l 13/06, G01l 7/08
[58] Field of Search ................ 280/150 AB; 137/68; 73/420, 389, 416, 393; 200/83 R, 83 A, 83 N

[56] References Cited
UNITED STATES PATENTS
3,735,376   5/1973   Kermer ............................ 200/83 R
3,786,843   1/1974   Stephenson ................. 280/150 AB Primary Examiner—Donald O. Woodiel
Attorney, Agent, or Firm—Auzville Jackson, Jr.; Harold W. Adams

[57] ABSTRACT

This is a temperature compensated pressure sensor for sensing a variation of a pressure fluid P1 within a container. The sensor provides a reference fluid pressure P2 and is mounted within the container so that the sensor assembly when subjected to a predetermined external fluid pressure is blown into the container.

7 Claims, 2 Drawing Figures

PATENTED NOV 26 1974          3,850,039

TEMPERATURE COMPENSATED PRESSURE SENSOR AND MOUNTING MEANS THEREFOR

This invention relates to a temperature compensated pressure sensor for sensing the variations in a fluid pressure P1 within a container including fluid pressure responsive mounting means therefor.

Figure 1:
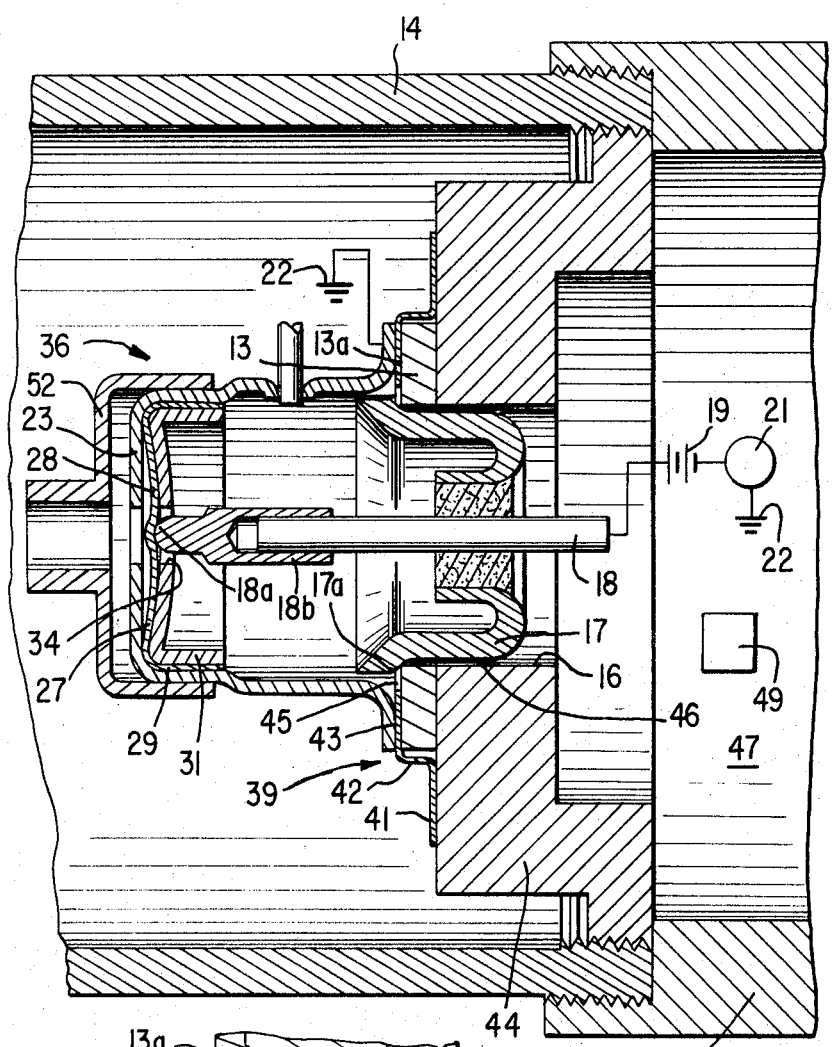
Figure 2:
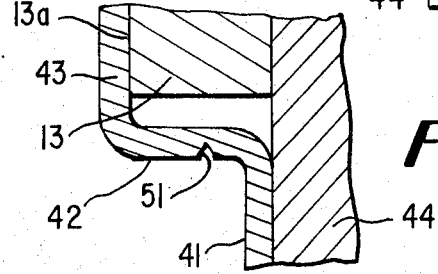

Numerous objects and advantages of the invention will become apparent from the following detailed description of a preferred embodiment of the invention when read in light of the appended drawing wherein:

FIG. 1 is a cross sectional view illustrating a temperature compensated pressure sensor mounted in a pressurized container in accordance with the invention; and FIG. 2 is an enlarged partial sectional view of the sensor release mounting plate.

Although a preferred embodiment of the invention is to be described for mounting a sensor used to sense a fluid loss pressure in a container used for inflating a vehicular safety air bag, it is to be understood the invention may be used in other devices.

Referring to FIG. 1 of the drawing a preferred embodiment of the invention is shown as comprising substantially the same elements and components as described in detail in a co-pending United States patent application filed on the same date as this application, assigned to the same assignee and identified as assignee's Docket No. 2407-FS and incorporated herein by reference. Like elements herein are therefore designated by the same reference numerals and will not be described in detail.

The operation of the sensor designated generally by the reference numeral 36 is the same as that described in the co-pending patent application diaphragm 27 and connector pin 18 are maintained in contact to light lamp when the control pressure P1 in container 14 is a desired value. When a determined loss in control pressure P1 occurs, the pressure difference between P1 and P2 moves diaphragm 27 out of contact with the connector pin to open the circuit.

Since the sensor 36 is in the container 14 and subject to the same temperature changes any pressure variation caused by such temperature changes are equal and opposite in effect upon diaphragm 27. Thus the sensor is not affected by pressure variations caused by temperature changes in the container.

The sensor assembly 36 of this invention is identical to that described in the co-pending application except for the use of pressure responsive release means 39 and the manner of mounting the sensor in container 14.

In this arrangement the pressure responsive release means is a shallow circular cup-shaped member having a flange 41, side wall 42 and base 43. The base 43 has a central opening 45 of a larger diameter than passage 16 in mounting ring 13. Out turned edge 17a of feed-through base 17 is welded directly and only to the mounting ring surface 13a around the passage 16.

The base 43 is sandwiched between flared end 12 of housing 11 and mounting ring surface 13a. This assembly is seam welded together completely around the periphery of the flared end 12a fixedly securing the housing 11 and mounting ring 13 together. This sensor assembly 36 is then mounted in container 14 by welding flange 41 around its periphery to an end wall 44 of the container 14. The sensor assembly is otherwise unattached to the container, mounting ring 13 resting freely on the adjacent face of end wall 44.

The end wall 44 includes a passage 46 that receives and exposes feed-through base 17 to the interior of a closed chamber 47 of a cylindrical container 48 attached to container 14.

Typically the sensor assembly 36 may be mounted in a pressurized container 14 used for rapidly inflating an air bag upon the occurrence of an impact of the vehicle or deceleration of the vehicle sufficient to detonate an explosive charge 49 in chamber 47.

Conventionally, the explosive change may be employed to instantly rupture a pressure barrier (not shown) in the container 14 to fluidly interconnect the container 14 with the air bag. The pressurized gas in the container 14 then rushes into and inflates the air bag. All of the above action must be completed in a matter of milli seconds to protect occupants of the vehicle.

In such a system employing the invention, detonation of the explosive charges causes a sudden, large increase in fluid pressure in chamber 47. The pressure responsive relief member 39 seals container 14 from chamber 47 and is formed of a material of sufficient thickness and shear and tensile strength to withstand the normal sensor operating fluid pressures P1 and P2 in the container 14 and sensor 36 but subject to rupture in tension or shear at or in the side wall 42 upon the rapid increase of pressure in chamber 47 caused by the explosion.

For instance the container control pressure P1 may be 2,000 PSI and the reference pressure P2 in the sensor 1,800 PSI. Such operating pressures maintain a 200 PSI pressure difference across diaphragm 27 pressing it into electrical contact with connector pin 18 to close a signal circuit and light indicator lamp 21. The signal circuit remains closed so long as fluid pressure P1 equals or exceeds reference pressure P2 by a determined amount.

A loss of pressure P1 below the determined amount creates a pressure difference that moves the diaphragm and opens the signal circuit indicating the loss of pressure P1. Upon sufficient deceleration to indicate an on impending impact of the vehicle, the explosive charge is detonated. The explosion instantly increases the pressure in chamber 47 to a value sufficient to rupture the member 39 and blow the sensor assembly 36 into the container 14.

This is achieved by making the welds between the feed-through base 17, the mounting ring 13, housing 11 and end wall 46 sufficiently strong to withstand the fluid pressure force caused by the explosion. Since mounting ring 13 rests freely on end wall 46 the pressure release member 39 is subjected to a rupturing force in both tension and shear in the side wall 42 between the weld points in the flange 41 and base 43.

Preferably the physical properties of the pressure release member 39 are such and the side wall dimensioned so rupture or cleavage occurs uniformly in and completely around the circular side wall at the same time. As shown in FIG. 2, the circular side wall 42 may be weakened by providing a notch or groove 51 completely around its periphery, this peripheral groove 51 reducing the thickness of the side wall and assisting in achieving a near instaneous uniform cleavage around the circular side wall 42.

This frees the entire sensor assembly 36 from end wall 46 permitting the fluid pressure in chamber 46 to blow the sensor assembly 36 into the container with great force. An open, cupshaped projection 52 press fit upon housing 11 may be provided to assist in piercing the pressure barrier or container 14 and releasing the pressurized gas into the air bag.

Although a preferred embodiment of the invention has been described in detail, numerous changes and modifications can be made within the principles of the invention which is to be limited in scope only by the appended claims.

What is claimed is:

1. In a device for sensing variations in a control fluid pressure P1 of a fluid in a first pressure chamber independently of and unaffected by pressure variations caused by temperature changes in said first chamber, said device including a cylindrical housing having an apertured base, a diaphragm movable by fluid pressure forming a second fluid pressure chamber in said housing, means for supporting said diaphragm in said second fluid pressure chamber, and signal means including said diaphragm and a connector pin normally engaged by said diaphragm when said second fluid pressure chamber is charged to a reference fluid pressure P2 and said control fluid pressure P1 remains a selected value, a determined variation in said control fluid pressure P1 causing said diaphragm to move relative to said connector pin to actuate said signal means and indicate said variation in control fluid pressure P1, the improvement comprising;

pressure responsive means for releasably mounting said housing within an end wall and between said first fluid pressure chamber and a third fluid pressure chamber, said pressure responsive means rupturing upon a determined increase of fluid pressure in said third pressure chamber.

2. A device as defined in claim 1 wherein said pressure responsive means for releasably mounting said housing comprises an integrally formed cupshaped plate having a base, side wall and flange, the base being positioned between an end of said housing and said mounting ring, the said housing base and mounting ring being fixedly and sealingly attached together and said flange being sealingly and fixedly secured to said end wall of said first chamber side wall being the only physical connection between said housing and mounting ring assembly and said end wall.

3. A device as defined in claim 2 wherein said side wall is weakened along a line extending around its periphery to facilitate the rupture thereof along said line.

4. A device as defined in claim 3 wherein said side wall is weakened by means of an external groove within and extending around said side wall.

5. In combination;

means for sensing pressure variations in a container; and pressure responsive means for mounting said pressure sensing means in an end wall of said container, said pressure responsive mounting means including a flange for attachment to end wall and a base for attachment to said pressure sensing means, said flange and base being interconnected by a cylindrical side wall integrally formed therebetween whereby said side wall is subjected to any forces of separation exerted between said end wall and said pressure sensing means resulting from an increase in fluid pressure externally of said container, the physical properties of said mounting means being such that said cylindrical side wall is ruptured completely around the periphery upon a determined increase in fluid pressure externally of said container, said pressure sensing means thereby being blown into said container.

6. The combination of claim 5 wherein said side wall is externally grooved around the periphery thereof to facilitate rupture at and along said groove.

7. The combination of claim 5 including a projection attached to said pressure sensing means.

\* \* \* \* \*